Nov. 5, 1968  J. H. DE WITT, JR  3,409,803
PROTECTIVE CIRCUIT FOR SOLID STATE REGULATED POWER SUPPLIES
Filed Nov. 16, 1966
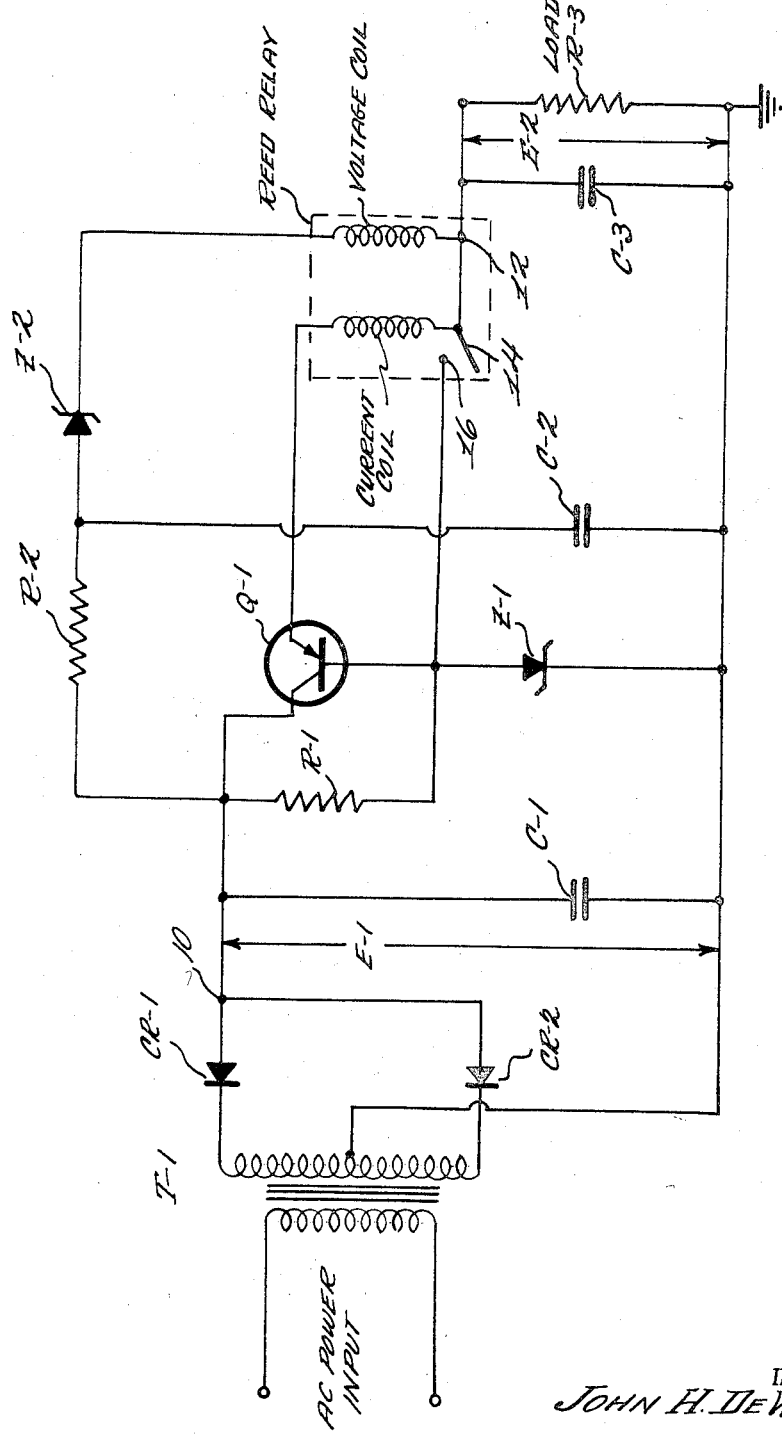
INVENTOR
JOHN H. DE WITT, JR
BY
ATTORNEYS United States Patent Office 3,409,803
Patented Nov. 5, 1968

3,409,803
PROTECTIVE CIRCUIT FOR SOLID STATE
REGULATED POWER SUPPLIES
John H. De Witt, Jr., 3602 Hood Hill Road,
Nashville, Tenn. 37215
Filed Nov. 16, 1966, Ser. No. 594,919
7 Claims. (Cl. 317—33)

ABSTRACT OF THE DISCLOSURE

Circuitry for protecting a current carrying regulator transistor against overload, the circuitry including a high speed reed relay which responds to overload current to immediately terminate the conduction of the transistor and which maintains the transistor in its non-conducting state.

A serious problem which arises in connection with solid state regulated power supplies is protection of the current carrying regulator transistors against short circuiting or overloading of the output. When the dissipation capability of a transistor is exceeded, even momentarily, the transistor frequently fails. It is well known that transistors are destroyed in this manner faster than any fuse which has been devised to protect them.

To overcome the problem, attempts have been made to design regulating circuits so that beyond a certain current load, the output voltage collapses but current remains at a maximum steady value. These attempts are frequently not satisfactory for the dissipation in the transistor under such conditions can cause it to fail in time.

Accordingly, it is a principal object of the invention to provide an improved protective circuit for transistor regulated power supplies which responds at extremely high speed to overload conditions to prevent damage to the transistor.

Another object of the invention is to provide a protective circuit for solid state regulated power supplies which contains a minimum number of inexpensive components.

Further objects and the entire scope of the invention will become more fully apparent when considered in light of the following detailed description of an illustrative embodiment of this invention and from the appended claims.

The illustrative embodiment may be best understood by reference to the accompanying drawing which is a schematic diagram of a preferred circuit arrangement.

Briefly, the invention provides a high speed reed relay which includes a current coil connected in the transistor conduction path. When the transistor is overloaded, the relay responds to excess current by closing its contact to interconnect the base and emitter of the transistor. This eliminates forward bias and cuts off the transistor.

Referring to the drawing, the structure of the illustrative embodiment will now be described. An AC power input is connected to the primary winding of a power transformer T-1. The cathodes of diodes CR-1 and CR-2 are respectively connected to opposite ends of the secondary winding of transformer T-1. The anodes of diodes CR-1 and CR2 are joined at 10, and a condenser C-1 is connected between point 10 and the grounded center-top of the secondary winding of transformer T-1. A series arrangement of resistor R-1 and Zener diode Z-1 is connected in parallel with condenser C-1, the cathode of Z-1 being grounded. A power regulator transistor Q-1 is provided having its collector connected to point 10 and its base joined to the junction between resistor R-1 and Zener diode Z-1. The emitter of transistor Q-1 is connected to a miniature reed relay. More particularly, the relay is of the conventional high speed type but one in which the magnetic shield, normally supplied over the exterior of the relay, is removed in favor of a current coil consisting of a few turns of wire. The purpose of this additional winding will become more apparent hereinafter. The actual connection of the emitter of Q-1 to the reed relay is achieved by connecting one end of the current coil to the emitter. The collector of transistor Q-1 is connected by a series arrangement of resistor R-2 and Zener diode Z-2 to one end of the voltage coil of the reed relay. The opposite ends of the current and voltage coils are joined at 12, and a parallel arrangement of load resistor R-3 and condenser C-3 is connected between point 12 and ground. The reed relay contact 14 is also joined to point 12. A contact terminal 16 is connected to the base of transistor Q-1. To complete the circuit, a condenser C-2 extends between the junction of resistor R-2 and Zener diode Z-2 to ground.

The system just described contemplates the use of a reed relay which has the capability of closing its contacts in one millisecond or less. The current coil of the relay is provided with the number of turns necessary to close the relay contact when the current rating of transistor Q-1 is exceeded.

In operation, power is supplied to the circuit by transformer coupling the AC input to the secondary winding of power transformer T-1. The arrangement of diodes CR-1 and CR2 and the smoothing capacitor C-1 fully rectifies the AC input to produce the voltage E-1 across condenser C-1.

The regulator includes transistor Q-1, reference Zener diode Z-1 and resistor R-1, which normally function in a conventional manner to produce the desired DC output E-2 across load resistor R-3. The condenser C-3 is employed across the output to maintain low impedance at high frequencies.

The protective circuit comprises the miniature reed relay resistor R-2, Zener diode Z-2 and condenser C-2. The condenser C-2 serves to delay the application of voltage to diode Z-2 when the power supply is turned on, in order that the regulator may be allowed to function and build up full voltage on the load without causing current to flow through the voltage coil and lock the reed relay. The Zener diode Z-2 is selected so as to have a breakdown voltage slightly above the highest voltage that would appear across transistor Q-1 under normal operating conditions. Resistor R-2 is chosen to prevent too much current passing through the voltage coil, but yet allowing sufficient current to maintain the relay closed when the protective circuit is functioning.

The operation of the circuit under adverse conditions will now be described. When the current rating of transistor Q-1 is exceeded, as might be caused by the existence of a short circuit or overload, the amperage in the current coil of the reed relay is sufficient to close relay contact 14. This connects the base of Q-1 to its emitter through the current coil. Under this condition, there is no forward bias on the base of the transistor so Q-1 is immediately cut off through normal transistor action. When transistor Q-1 cuts off, the voltage E-2 across the load resistor R-3 collapses and the full rectifier voltage E-1 appears between the collector and emitter of Q-1. This voltage is sufficient to overcome the breakdown voltage of Zener diode Z-2, which causes the relay to hold in through its voltage coil. After the reed relay has operative state until such time as the AC input voltage is removed, the regulator circuit will remain in its nonoperative state until such time as the AC input voltage is interrupted for a short period of time allowing the protective circuit to return to its initial state.

It should be appreciated that the above-described protective circuit may be utilized in any number of other regulator circuits operable over wide ranges of voltages and currents. Furthermore, various modifications of the protective circuit can be made. For example, the relay contact 14 may be connected so as to directly join the base of transistor Q-1 to its emitter when the contact is closed. Also in certain applications, the condenser C-2 may not be required. In the illustrative embodiment, transistor Q-1 is shown as being of the PNP type. However, it is apparent that a NPN transistor could be utilized if the sense of the various diodes were rearranged.

The success of the foregoing circuit is attributable to the fact that the miniature reed relay operates so that there is insufficient time for the transistor to overheat internally and fail.

The above-described embodiment is illustrative of a preferred embodiment of the invention but it is not intended to limit the possibilities of insuring protection of solid state regulators in the presence of currents exceeding normal values. The protective circuit disclosed herein is an example of an arrangement in which the inventive features of this disclosure may be utilized, and it will become apparent to one skilled in the art that certain modifications may be made within the spirit of the invention as defined by the appended claims.

What is claimed is:

1. A protective circuit for a current carrying transistor comprising:
   a reed relay having first and second windings and a contact member operatively related to said windings;
   means connecting said first winding in the current path of the transistor, said first winding being provided with a number of turns sufficient to close the the relay contact only when the current rating of the transistor is exceeded;
   a first conductive path including said relay contact and extending between the base and the emitter of the transistor when said contact is closed; and
   a second conductive path including said second winding and extending between the collector and the emitter of said transistor to hold said relay contact closed after its closure is caused by excess current in the first winding.

2. A protective circuit as set forth in claim 1, wherein said first conductive path also includes the first winding.

3. A protective circuit as set forth in claim 1, further comprising:
   a Zener diode connected in series with the second winding in said second conductive path, said diode having a breakdown voltage which is greater than the highest voltage appearing across said transistor during normal operating conditions.

4. A protective circuit as set forth in claim 3, further including:
   a condenser extending between the second conductive path and ground.

5. A protective circuit for a current carrying transistor comprising:
   a reed relay having first and second windings and a contact member operatively related to said windings;
   means connecting said first winding in the current path of the transistor, said first winding being provided with a number of turns sufficient to close the relay contact only when the current rating of the transistor is exceeded;
   a first conductive path including said relay contact and extending between the base and the emitter of said transistor when the contact is closed; and
   a second conductive path including: a resistor, a Zener diode having a breakdown voltage which is greater than the highest voltage appearing across said transistor during normal operating conditions, and the second winding; said second path extending between the collector and the emitter of the transistor to hold the relay contact closed after its closure is caused by excess current in the first winding.

6. A protective circuit as set forth in claim 5, further comprising:
   a condenser extending from said second conductive path to ground, the condenser being connected to said second path at a point between the resistor and the Zener diode.

7. A protective circuit as set forth in claim 5, wherein said first conductive path also includes the first winding.

References Cited

UNITED STATES PATENTS

| | | | |
|---|---|---|---|
| 3,271,630 | 9/1966 | Miyazawa | 317—33 X |
| 3,307,075 | 2/1967 | Park | 317—33 |
| 3,364,392 | 1/1968 | Lafreniere | 317—33 |

JOHN F. COUCH, *Primary Examiner.*

A. D. PELLINEN, *Assistant Examiner.*